(12) United States Patent
Norris et al.

(10) Patent No.: US 7,006,968 B2
(45) Date of Patent: Feb. 28, 2006

(54) DOCUMENT CREATION THROUGH EMBEDDED SPEECH RECOGNITION

(75) Inventors: Corey J. Norris, Meridian, ID (US); Steve R. Wiley, Boise, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 672 days.

(21) Appl. No.: 09/976,534

(22) Filed: Oct. 11, 2001

(65) Prior Publication Data

US 2003/0072013 A1 Apr. 17, 2003

(51) Int. Cl.
*G10L 15/00* (2006.01)
(52) U.S. Cl. .................... 704/235; 704/275
(58) Field of Classification Search ........... 704/235, 704/270, 275
See application file for complete search history.

(56) References Cited

U.S. PATENT DOCUMENTS

| 5,051,924 | A | * | 9/1991 | Bergeron et al. | 704/200 |
|---|---|---|---|---|---|
| 5,168,548 | A | * | 12/1992 | Kaufman et al. | 704/200 |
| 5,231,670 | A | * | 7/1993 | Goldhor et al. | 704/275 |
| 5,950,167 | A | * | 9/1999 | Yaker | 704/275 |
| 5,995,936 | A | * | 11/1999 | Brais et al. | 704/275 |
| 6,006,183 | A | * | 12/1999 | Lai et al. | 704/235 |
| 6,243,682 | B1 | * | 6/2001 | Eghtesadi et al. | 704/270 |
| 6,332,120 | B1 | * | 12/2001 | Warren | 704/235 |
| 6,839,669 | B1 | * | 1/2005 | Gould et al. | 704/246 |

* cited by examiner

*Primary Examiner*—Daniel Abebe
(74) *Attorney, Agent, or Firm*—Hewlett-Packard Company

(57) ABSTRACT

Audio data is captured, then filtered to extract text data and print commands. The audio data is captured by sensing the audio data, generating an analog audio data signal in response to the sensed audio data, and digitizing the analog audio data signal into captured audio data. The text data is converted to electronic text. The electronic text is accumulated in a text buffer. Audio data is captured and filtered to extract text data and print comments until a print command is extracted from the audio data. When a print command is extracted from the audio data, the accumulated electronic text is translated into a rendered document. The electronic text is either translated alone or with a form template. The rendered document is printed and the text buffer is purged.

18 Claims, 3 Drawing Sheets

DOCUMENT CREATION THROUGH EMBEDDED SPEECH RECOGNITION

FIELD OF THE INVENTION

This invention relates in general to voice recognition technology and, more particularly, to voice recognition technology in a printing device.

BACKGROUND OF THE INVENTION

Often there is a need to transcribe spoken words to printed text. Traditionally, transcription has been accomplished by transcriptionists who listen to spoken words and transcribe the spoken words to readable documents. The spoken words are either spoken concurrently with the transcription or previously recorded and played back for the transcriptionist. Manual transcription by a transcriptionist is time consuming, costly, and error prone.

Speech recognition software has been developed for recognizing words of human speech. In one conventional application of the speech recognition software, words are recognized and reproduced as electronic text in a computer word processor. The electronic text is then available for editing, manipulation, and printing using the functions of the word processor. While convenient, this application of speech recognition software requires a user to manually intervene in order to obtain a printed record of the electronic text.

SUMMARY OF THE INVENTION

According to principles of the present invention, audio data is captured, then filtered to extract text data and print commands. The text data is converted to electronic text. The electronic text is accumulated in a text buffer. Audio data is captured and filtered until a print command is extracted from the audio data. All of the extracted text data is converted to electronic text, which is accumulated in the text buffer. When a print command is extracted from the audio data, the electronic text is translated into a rendered document. The electronic text is either translated alone or with a form template. The rendered document is printed and the text buffer is purged.

According to further principles of the present invention, the audio data is captured by first sensing the audio data. An analog audio data signal is generated in response to the sensed audio data. The analog audio data signal is digitizing into captured audio data.

According to further principles of the present invention, the captured audio data is filtered by first comparing the captured audio data with text data selection criteria and print command selection criteria. The captured audio data meeting the print command selection criteria is extracted as a print command. The captured audio data meeting the text data selection criteria is extracted as text data, According to further principles of the present invention, the text data is converted to electronic text by inputting the text data into a speech recognition module and receiving electronic text from the speech recognition module.

DETAILED DESCRIPTION OF THE INVENTION

Figure 1:
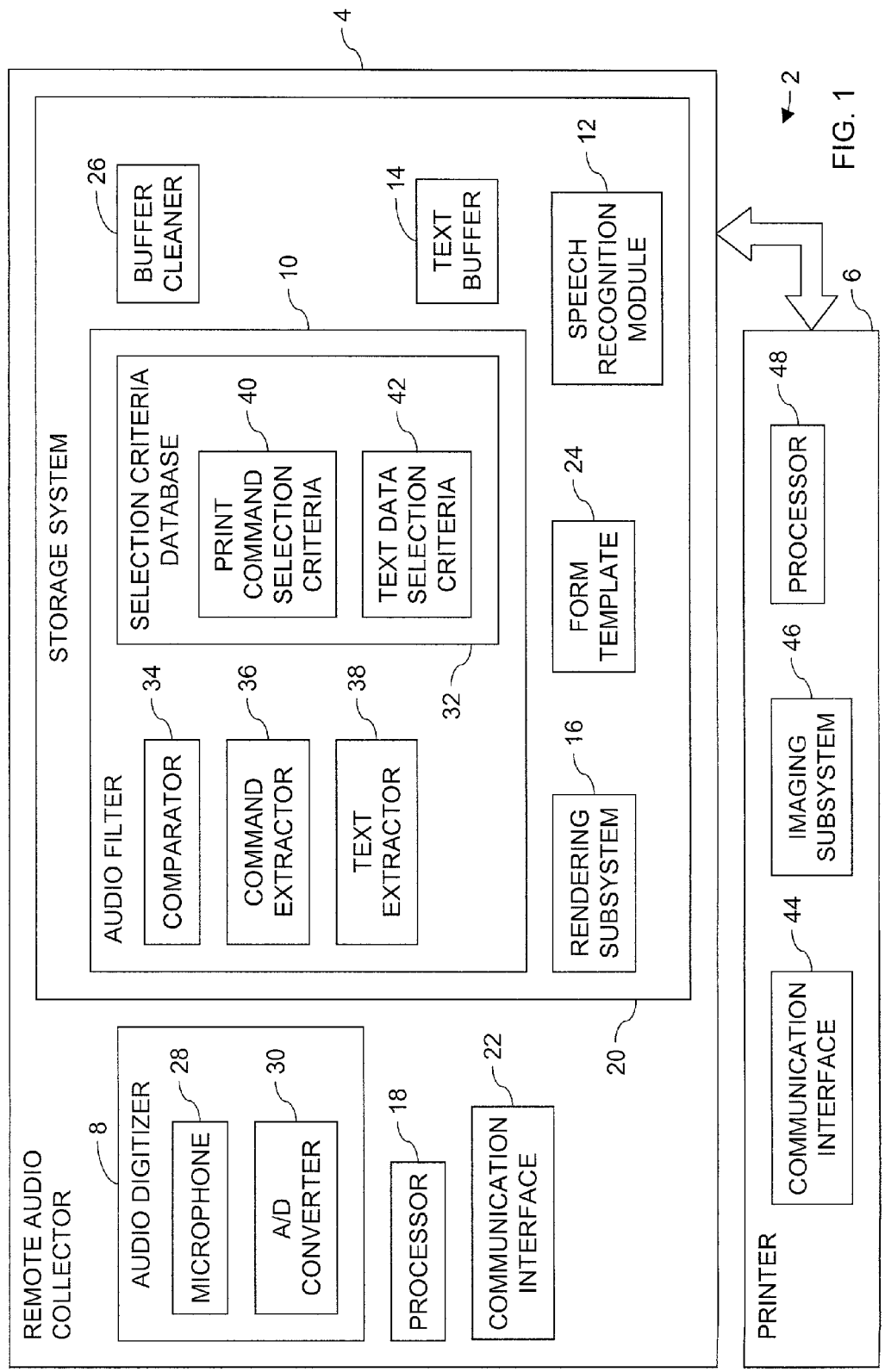
FIG. 1 is a block diagram representing one embodiment of the system of the present invention for printing text.

Illustrated in FIG. 1 is a system 2 for printing text. System 2 includes a remote audio collector 4 and a printer 6. Remote audio collector 4 includes an audio digitizer 8, an audio filter 10, a speech recognition module 12, a text buffer 14, a rendering subsystem 16, a processor 18, a storage system 20, and a communication interface 22. Additionally, remote audio collector 4 optionally includes a form template 24 and a buffer cleaner 26.

Audio digitizer 8 is any combination of hardware and executable code configured to capture audio data. Executable code is any code capable of execution by a processor or processing system. Examples of executable code include software, firmware, and hardwired code.

In one embodiment, audio digitizer 8 includes a microphone 28 and an analog to digital (A/D) converter 30. Microphone 28 is any electronic device configured to sense audio data and generate an analog audio data signal in response to the sensed audio data. A/D converter 30 is any combination of hardware and executable code configured to digitize the analog audio data signal into captured audio data. In one embodiment, A/D converter 30 is a sound card for a computer system.

Audio filter 10 is any combination of hardware and executable code configured to filter captured audio data to extract text data and print commands. In one embodiment, audio filter 10 includes a selection criteria database 32, a comparator 34, a print command extractor 36, and a text data extractor 38.

Selection criteria database 32 is any form of database configured to hold print command selection criteria 40 and text data selection criteria 42. Print command selection criteria 40 is any criteria configured to select a print command from the audio data. Examples of print command selection criteria 40 include amplitude, frequency, and duration criteria indicative of a print command. The amplitude, frequency, and duration criteria may be user configurable to suit a user.

Text data selection criteria 42 is any criteria for selecting a text data from the audio data. Examples of text data selection criteria 42 include amplitude, frequency, and duration criteria indicative of a text data. The amplitude, frequency, and duration criteria may be user configurable to suit a user.

Comparator 34 is any combination of hardware and executable code configured to compare captured audio data with print command selection criteria 40 and text data selection criteria 42. In one embodiment, comparator 34 is executable code performed by processor 18 to compare captured audio data with print command selection criteria 40 and text data selection criteria 42.

Print command extractor 36 is any combination of hardware and executable code configured to extract, as a print command, captured audio data meeting the print command selection criteria 40. In one embodiment, print command extractor 36 is executable code performed by processor 18 to extract, as a print command, captured audio data meeting the print command selection criteria 40.

Text data extractor 38 is any combination of hardware and executable code configured to extract, as text data, captured audio data meeting the text data selection criteria 42. In one embodiment, text data extractor 38 is executable code performed by processor 18 to extract, as text data, captured audio data meeting the text data selection criteria 42.

Speech recognition module 12 is any combination of hardware and executable code configured to convert text data to electronic text. In one embodiment, speech recognition module 12 is executable code performed by processor 18 to convert text data to electronic text.

Text buffer 14 is any combination of hardware and executable code configured to accumulate electronic text. In one embodiment, text buffer 14 is a portion of storage system 20 designated to accumulate the electronic text.

Rendering subsystem 16 is any combination of hardware and executable code configured to translate electronic text accumulated in text buffer 14 into a rendered document. In one embodiment, rendering subsystem 16 is executable code performed by processor 18 to translate electronic text accumulated in text buffer 14 into a rendered document.

Processor 18 is any device or system configured to process executable code. Processor 18 controls remote audio collector 4.

Storage system 20 is any system configured to store data or executable code. Storage system 20 may also be a program storage system tangibly embodying a program, applet, or instructions executable by processor 18 for performing the method steps of the present invention executable by processor 18. Storage system 20 may be any type of storage media such as magnetic, optical, or electronic storage media. Storage system 20 is illustrated in FIG. 1 as a single device. Alternatively, storage system 20 may include a plurality of devices. Furthermore, each device of storage system 20 may be embodied in a different media type. For example, one device of storage system 20 may be a magnetic storage media while another device of storage system 20 is an electronic storage media.

Communication interface 22 is any device or system configured to allow remote audio collector 4 to communicate with printer 6. Examples of communication interface 22 include a direct connection interface and a network interface.

Form template 24 is any template saved in any suitable fashion for use by rendering subsystem 16 with the text data. In one embodiment, form template 24 includes empty fields into which text data is inserted before rendering the text data with form template 24.

Buffer cleaner 26 is any combination of hardware and executable code configured to purge text buffer 14. In one embodiment, buffer cleaner 26 is executable code performed by processor 18 to purging text buffer 14 after the rendered document is printed.

Printer 6 includes a communication interface 44, an imaging subsystem 46, and a processor 48. Imaging subsystem 46 is any combination of hardware and executable code configured to print a rendered document. Processor 48 is any device or system configured to process executable code. Processor 48 controls printer 6.

Communication interface 44 is any device or system configured to allow printer 6 to communicate with remote audio collector 4. Examples of communication interface 44 include a direct connection interface and a network interface. Communication interface 44 is of a type suitable for use with communication interface 22 of remote audio collector 4.

Figure 2:
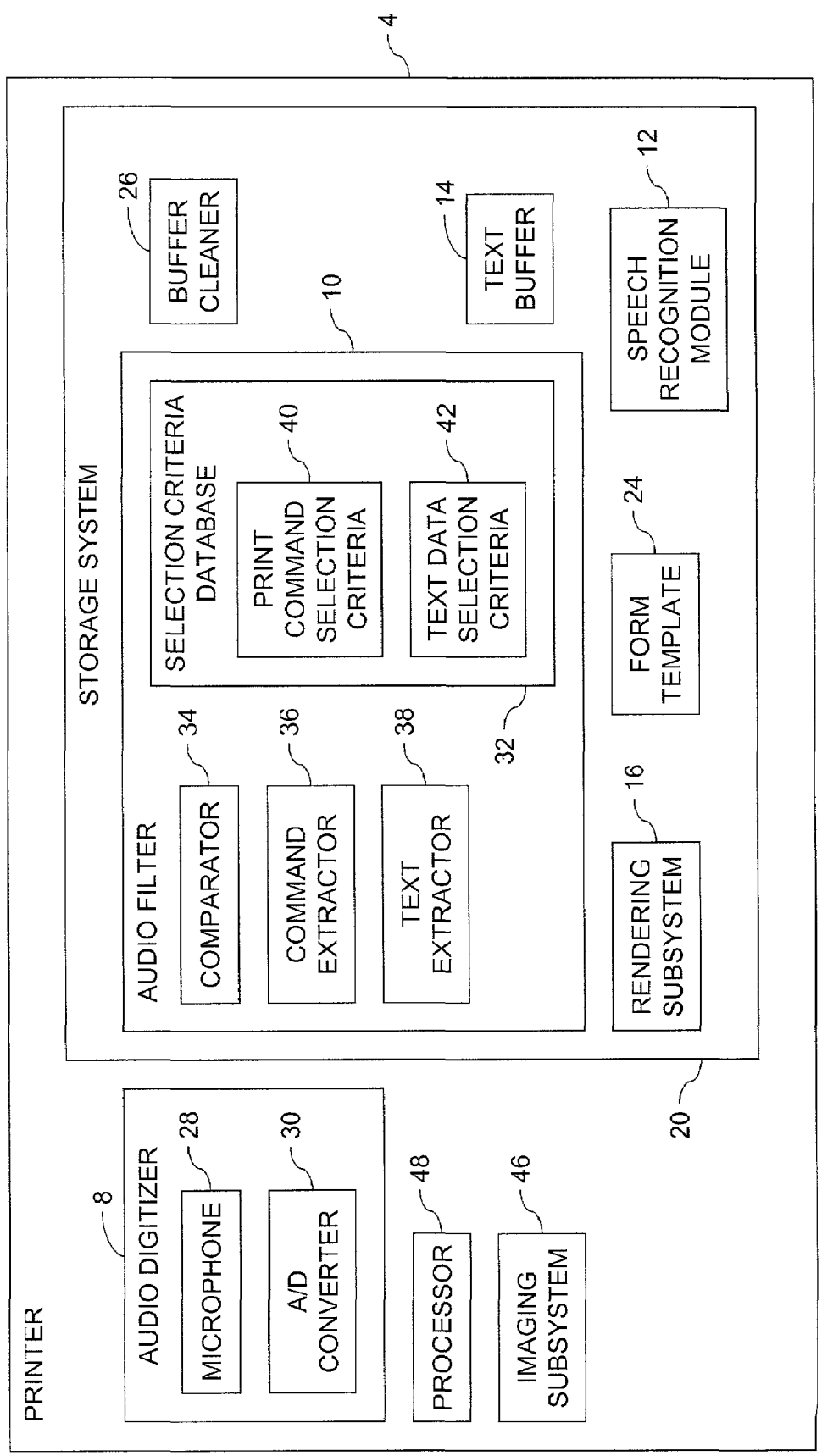
FIG. 2 is a block diagram representing an alternate embodiment of the system of the present invention for printing text.

Illustrated in FIG. 2 is an alternate embodiment of system 2, wherein components of the remote audio collector illustrated in FIG. 1 are embedded in printer 6. Components in FIG. 2 identically numbered to components in FIG. 1 are identical in function to the components in FIG. 1, but may differ in actual embodiment.

Printer 2 includes audio digitizer 8, audio filter 10, speech recognition module 12, text buffer 14, rendering subsystem 16, storage system 20, imaging subsystem 46, and processor 48. Additionally, printer 6 optionally includes form template 24 and buffer cleaner 26. Audio digitizer 8, audio filter 10, speech recognition module 12, text buffer 14, rendering subsystem 16, storage system 20, imaging subsystem 46, processor 48, form template 24, and buffer cleaner 26 are as previously described.

Figure 3:
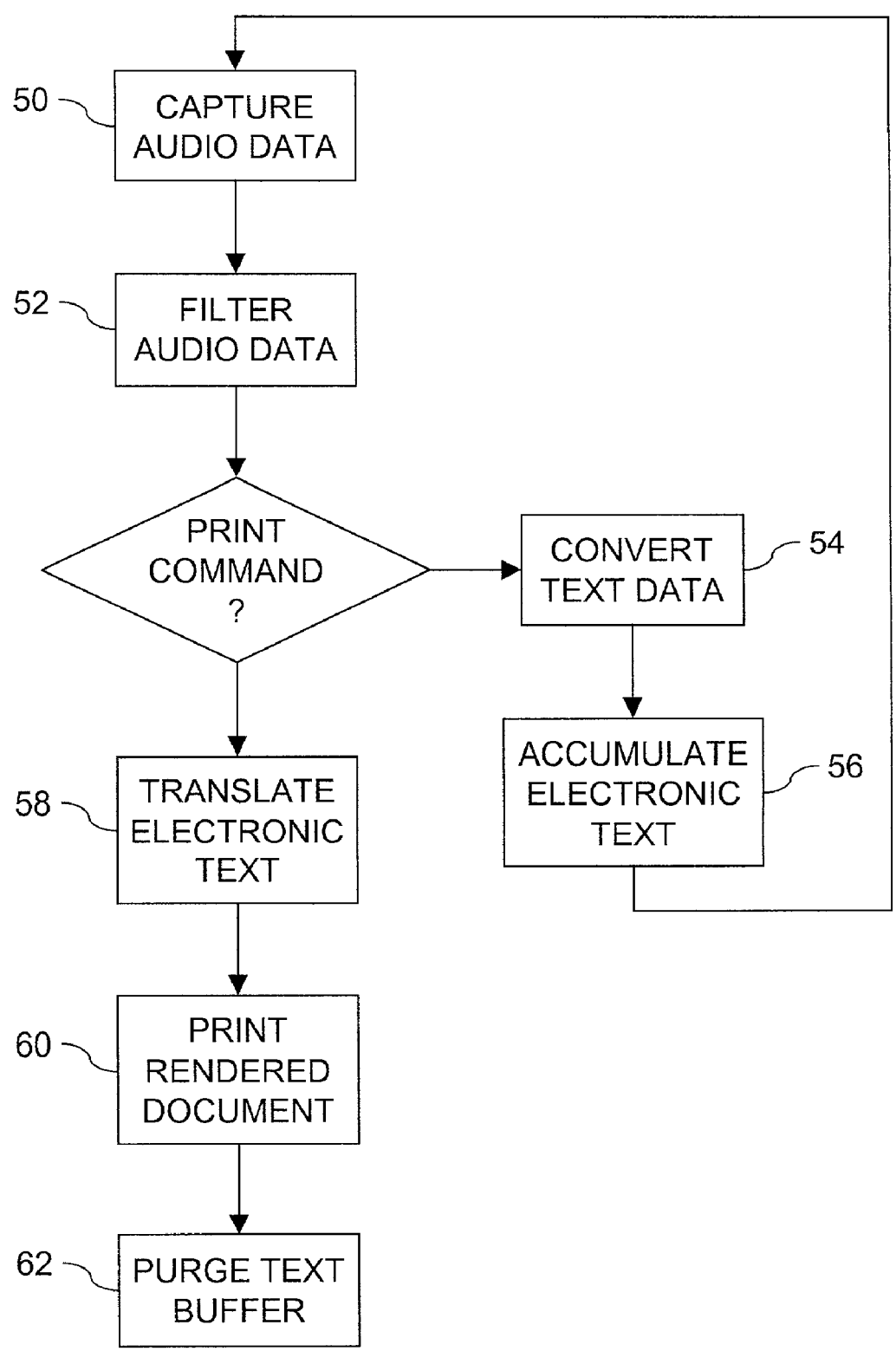
FIG. 3 is a flow chart illustrating one embodiment of the method of the present invention for printing text.

FIG. 3 is a flow chart representing steps of one embodiment of the present invention. Although the steps represented in FIG. 3 are presented in a specific order, the present invention encompasses variations in the order of steps. Furthermore, additional steps may be executed between the steps illustrated in FIG. 3 without departing from the scope of the present invention.

Audio data is captured 50. In one embodiment, the audio data is captured by sensing the audio data and generating an analog audio data signal in response to the sensed audio data. The analog audio data signal is digitized into captured audio data.

The captured audio data is filtered 52 to extract text data and print commands. In one embodiment, captured audio data is filtered 52 by comparing the captured audio data with text data selection criteria and print command selection criteria. The captured audio data meeting the print command selection criteria is extracted as a print command. The captured audio data meeting the text data selection criteria is extracted as text data.

If a print command is not extracted from the audio data and instead text data is extracted from the audio data, the text data is converted 54 to electronic text. In one embodiment, the text data is extracted by inputting the text data into speech recognition module 12 and receiving electronic text from speech recognition module 12.

The electronic text is accumulated 56 in text buffer 14. In one embodiment, the electronic text is accumulated 56 in text buffer 14 by appending the electronic text to contents of text buffer 14.

The process is repeated until a print command is extracted from the audio data. The electronic text accumulated in the text buffer is translated 58 into a rendered document. Translating 58 the electronic text into a rendered document includes translating the electronic text into a form ready for printing. In one embodiment, the electronic text is combined with form template 24 before translating 58. The electronic text with form template 24 are translated into the rendered document.

The rendered document is printed 60. Printing 60 the rendered document includes reproducing the rendered document onto print media. In one embodiment, after the rendered document is printed 60, the text buffer is purged 62.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for printing text, the method comprising:
   (a) capturing audio data;
   (b) filtering the captured audio data to extract text data and print commands;
   (c) converting the text data to electronic text;

(d) accumulating the electronic text in a text buffer;
(e) repeating steps (a) through (d) until a print command is extracted from the audio data;
(f) combining the electronic text accumulated in the text buffer with a form template;
(g) translating the electronic text with the form template into a rendered document; and,
(h) printing the rendered document.

2. The method of claim 1 wherein capturing the audio data includes:
(a) sensing the audio data;
(b) generating an analog audio data signal in response to the sensed audio data; and,
(c) digitizing the analog audio data signal into captured audio data.

3. The method of claim 1 wherein filtering the captured audio data includes:
(a) comparing the captured audio data with text data selection criteria and print command selection criteria;
(b) extracting, as a print command, the captured audio data meeting the print command selection criteria; and,
(c) extracting, as text data, the captured audio data meeting the text data selection criteria.

4. The method of claim 1 wherein converting the text data to electronic text includes:
(a) inputting the text data into a speech recognition module; and,
(b) receiving electronic text from the speech recognition module.

5. The method of claim 1 wherein accumulating the electronic text includes appending the electronic text to contents of the text buffer.

6. The method of claim 1 wherein translating the electronic text includes translating the electronic text into a form ready for printing.

7. The method of claim 1 wherein printing the rendered document includes reproducing the rendered document onto print media.

8. The method of claim 1 further including purging the text buffer after printing the rendered document.

9. A system for printing text, the system comprising:
(a) an audio digitizer configured to capture audio data;
(b) an audio filter configured to filter captured audio data to extract text data and print commands;
(c) a speech recognition module configured to convert text data to electronic text until the audio text filter extracts a print command from the audio data;
(d) a text buffer configured to accumulate the electronic text until the audio text filter extracts a print command form the audio data; (e) a rendering subsystem configured to combine the electronic text accumulated in the text buffer with a form template and translate the electronic text with the form template into a rendered document; and,
(f) an imaging subsystem configured to print the rendered document.

10. The system of claim 9 wherein the audio digitizer includes:
(a) a microphone configured to sense audio data and generate an analog audio data signal in response to the sensed audio data; and,
(b) an analog to digital converter configured to digitize the analog audio data signal into captured audio data.

11. The system of claim 9 wherein the audio filter includes:
(a) a selection criteria database including text data selection criteria and print command selection criteria;
(b) a comparator configured to compare captured audio data with the text data selection criteria and the print command selection criteria;
(c) a print command extractor configured to extract, as a print command, captured audio data meeting the print command selection criteria; and,
(d) a text data extractor configured to extract, as text data, captured audio data meeting the text data selection criteria.

12. The system of claim 9 further including a buffer cleaner configured to purge the text buffer after printing the rendered document.

13. A program storage system readable by a computer, tangibly embodying a program, applet, or instructions executable by the computer to perform method steps for printing text, the method steps comprising:
(a) capturing audio data;
(b) filtering the captured audio data to extract text data and print commands;
(c) converting the text data to electronic text;
(d) accumulating the electronic text in a text buffer;
(e) repeating steps (a) through (d) until a print command is extracted from the audio data;
(f) combining the electronic text accumulated in the text buffer with a form template;
(g) translating the electronic text with the form template into a rendered document; and,
(h) printing the rendered document.

14. The program storage system of claim 13 wherein the method step of capturing the audio data includes:
(a) sensing the audio data;
(b) generating an analog audio data signal in response to the sensed audio data; and,
(c) digitizing the analog audio data signal into captured audio data.

15. The program storage system of claim 13 wherein the method step of filtering the captured audio data includes:
(a) comparing the captured audio data with text data selection criteria and print command selection criteria;
(b) extracting, as a print command, the captured audio data meeting the print command selection criteria; and,
(c) extracting, as text data, the captured audio data meeting the text data selection criteria.

16. The program storage system of claim 13 wherein the method step of converting the text data to electronic text includes:
(a) inputting the text data into a speech recognition module; and,
(b) receiving electronic text from the speech recognition module.

17. The program storage system of claim 13 wherein the method step of printing the rendered document includes reproducing the rendered document onto print media.

18. The program storage system of claim 13 wherein the method steps further include purging the text buffer after printing the rendered document.

* * * * *

UNITED STATES PATENT AND TRADEMARK OFFICE
CERTIFICATE OF CORRECTION

PATENT NO. : 7,006,968 B2  Page 1 of 1
APPLICATION NO. : 09/976534
DATED : February 28, 2006
INVENTOR(S) : Corey J. Norris et al.

It is certified that error appears in the above-identified patent and that said Letters Patent is hereby corrected as shown below:

In column 5, line 50, in Claim 9, delete "form" and insert -- from --, therefor.

Signed and Sealed this

Twenty-fifth Day of August, 2009

David J. Kappos
*Director of the United States Patent and Trademark Office*